F. L. STUART.
LOADING APPARATUS.
APPLICATION FILED JAN. 21, 1918.
1,271,628. Patented July 9, 1918.
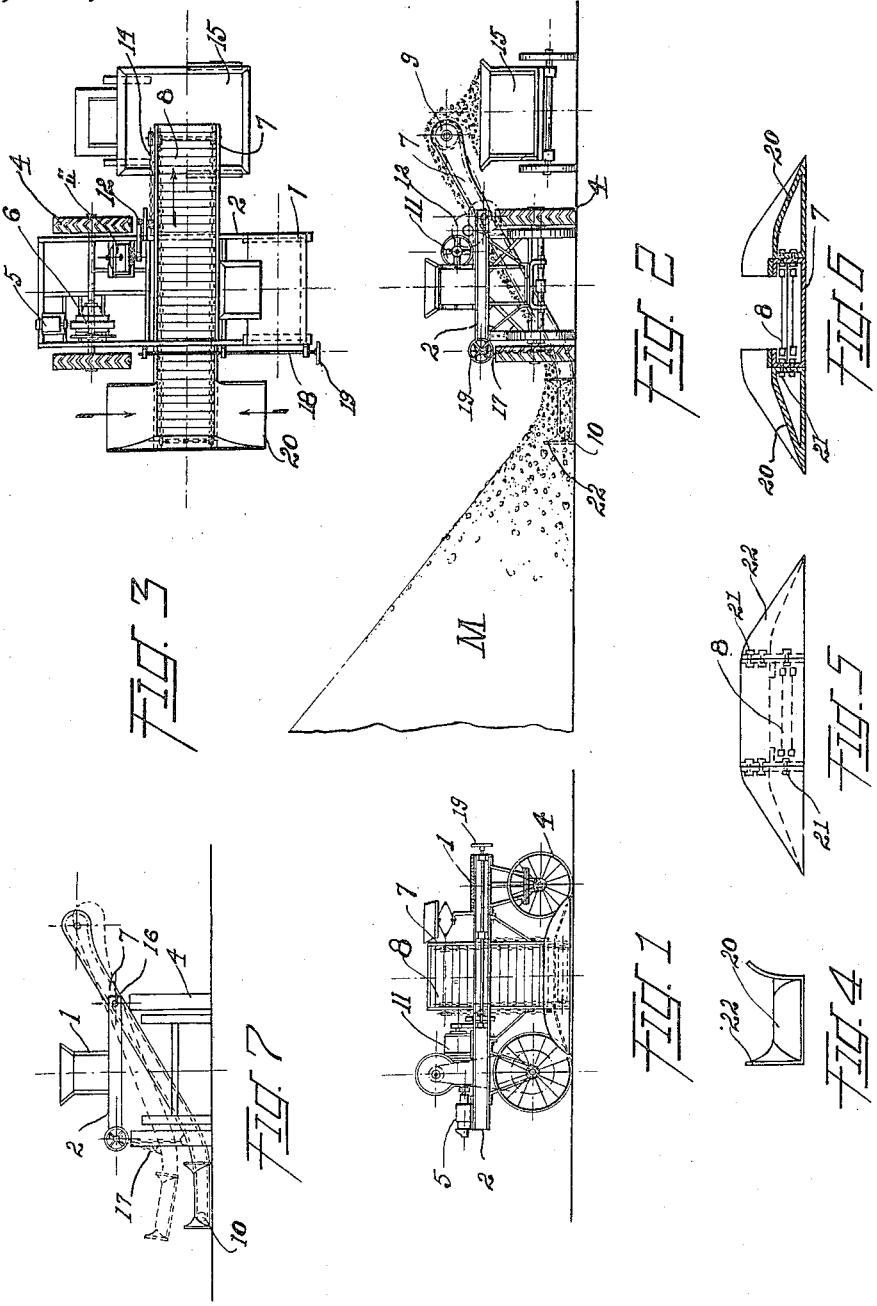

UNITED STATES PATENT OFFICE.

FRANCIS LEE STUART, OF WASHINGTON, DISTRICT OF COLUMBIA, ASSIGNOR TO INTERNATIONAL CONVEYOR CORPORATION, OF NEW YORK, N. Y.

LOADING APPARATUS.

1,271,628.
Specification of Letters Patent.
Patented July 9, 1918.

Application filed January 21, 1918. Serial No. 212,973.

*To all whom it may concern:*

Be it known that I, FRANCIS LEE STUART, a citizen of the United States, residing at Washington, in the District of Columbia, have invented certain new and useful Improvements in Loading Apparatus, of which the following is a specification.

This invention relates broadly to apparatus for handling material in bulk, and more particularly to a portable reclaiming or loading apparatus comprising an elevator and having scraper plows coöperating therewith for bringing the material into operative position with the conveyer.

The principal object of the present invention is to provide a portable loading apparatus adjustably supported on a movable carrier so that the same may be moved from place to place as desired.

A further object of the present invention is to provide means for adjusting the loading conveyer so that the same may enter the pile of material being handled at various heights.

The foregoing and other objects, together with their attendant advantages, will be apparent as the invention becomes understood by reference to the accompanying specification and drawings forming a part thereof, throughout the several views of which like characters of reference are used to indicate like parts.

Referring to the drawings, Figure 1 is a side view of my improved loading apparatus.

Fig. 2 is an end view of my improved apparatus in operative relation to material being loaded.

Fig. 3 is a plan view of the apparatus shown in Fig. 2.

Fig. 4 is an end view of one of the scraper plows.

Fig. 5 is a detail view of the scraper plows.

Fig. 6 is a detail sectional view through the scraper plows, and Fig. 7 is a diagrammatic view.

In handling materials in bulk, such as coal, ore, gravel, and the like, it is customary to transfer the material from a main source of supply into a plurality of storage piles which may be scattered at some distance one from the other. It is the primary purpose of the present invention to provide a portable loading apparatus which may be moved from place to place to reload the material from the storage piles. An apparatus of the type herein disclosed is useful particularly in connection with municipal work requiring the handling of scattered piles of material.

Referring more particularly to the drawings, I have illustrated my improved loading apparatus as comprising a supporting carriage, tractor or the like 1 consisting of the usual frame 2 carried by supporting wheels 4. While the carriage 1 is adapted to be moved in any desired manner, I may provide the same with a motor 5 transmitting power to the rear supporting wheels 4 through a differential mechanism 6. The differential mechanism, as is customary in devices of this general nature, is adapted to equalize the driving force during the passage of the supporting carriage around obstructions or the like.

Extending transversely of the frame 2 is a conveyer frame 7 supporting an endless conveyer 8 passing around a tripper roll 9 located adjacent the upper end of the conveyer frame, and around a guide roll 10 adjacent the lower end of the frame. The conveyer may be driven by any suitable source of power 11 through gearing 12 and a sprocket chain or its equivalent 14 in operative engagement with the upper tripper roll. It will be obvious that upon operation of the conveyer the material carried thereby will be discharged over the tripper roll into a wagon or other vehicle 15 which it is desired to load.

In its preferred form, the conveyer frame has a pivotal mounting 16 in the carriage frame 2, and is provided with a lifting mechanism comprising chains or cables 17 adapted to be taken up or played out by the shaft 18 when operated by the hand wheel 19.

The lower end of the conveyer frame is provided with scraper plows 20 of the type disclosed and claimed in my copending application Serial No. 208,598, filed December 24, 1917. These scraper plows preferably extend in opposite directions from the sides of the conveyer frame to which they are detachably secured by means of suitable fastenings 21. A curved mold board or edge piece 22 is provided on the outer edge of the scraper plows for coöperating with the material M being loaded so as to guide the same onto the elevating conveyer.

In operation the supporting carriage is moved to desired position adjacent a pile of material M, and the scraper plows are then forced into the toe or edge of the pile of material as illustrated more particularly in Fig. 2 of the drawings. Upon operating the conveyer, as described, which extends transversely to the direction of travel of the scraper plows, the stability or slope of the pile of material is destroyed so that it gravitates onto the conveyer by which it is loaded into the vehicles provided.

It frequently happens that due to irregularities in the surface on which the material is piled that it becomes necessary to cause the scraper plows to enter the pile of material at different elevations. This may be readily accomplished by the lifting mechanism referred to. This adjustment is also valuable in reclaiming or loading material which is disposed on a level either above or below that on which the carriage 1 is traveling.

It will be obvious that the elevating conveyer may be in the form of an endless belt, bucket conveyer, or any other well known type, and that changes may be made in the structural embodiment of the apparatus disclosed within the scope of the appended claim.

What I claim is:

A portable loading apparatus, comprising a movable supporting wheeled carriage, a scraper plow projecting from and arranged wholly beyond the side of the carriage and its wheels and which is supported on its inner side only, a conveyer belt extending at its outer end across the rear portion of the plow, but having both its receiving and return portions below the level of the bottom of the plow, a roller carried by the plow around which the lower end of the belt extends, said conveyer belt having its upper end extending beyond the opposite side of the carriage, and means for driving the conveyer.

In testimony whereof I have hereunto subscribed my name.

FRANCIS LEE STUART.

Copies of this patent may be obtained for five cents each, by addressing the "Commissioner of Patents, Washington, D. C."